United States Patent [19]

Myers et al.

[11] Patent Number: 4,726,614
[45] Date of Patent: Feb. 23, 1988

[54] VEHICLE BODY PROTECTOR BUMPER

[75] Inventors: Philip J. Myers, San Anselmo; Raymond J. McKinnon, Jr., Castro Valley; Jay Wilson, Portola Valley, all of Calif.

[73] Assignee: Innovique Corporation, San Anselmo, Calif.

[21] Appl. No.: 900,020

[22] Filed: Aug. 25, 1986

[51] Int. Cl.⁴ .............................................. B60R 13/04
[52] U.S. Cl. .......................................... 293/128; 293/1
[58] Field of Search ........................... 293/1, 102, 128; 280/770

[56] References Cited

U.S. PATENT DOCUMENTS

| | | | |
|---|---|---|---|
| 2,889,165 | 6/1959 | Zientara | 293/128 X |
| 3,243,223 | 3/1966 | Hoshell | 293/128 X |
| 3,367,702 | 2/1968 | Sauer | 293/128 |
| 3,582,134 | 6/1971 | Shaff | 293/128 X |
| 3,596,962 | 8/1971 | Hertzell | 293/128 |
| 4,002,363 | 1/1977 | James | 293/128 |
| 4,265,383 | 5/1981 | Ferguson | 293/1 X |
| 4,401,331 | 8/1983 | Ziner et al. | 293/128 |
| 4,463,539 | 8/1984 | Simon | 293/128 X |

Primary Examiner—Robert B. Reeves
Assistant Examiner—Russell D. Stormer
Attorney, Agent, or Firm—Alan H. MacPherson; Paul J. Winters; Richard Franklin

[57] ABSTRACT

A vehicle body panel protector bumper 10 comprising semi-flexible tubular members 20 having base sides 22 with magnets 28 for mounting in a selected position on a body panel 5, with a lengthwise adjustable security tab 60 for attachment to a door edge 7, and connected by a flexible hinge-connector strap 90 for convenient mounting, dismounting, and storage.

17 Claims, 10 Drawing Figures

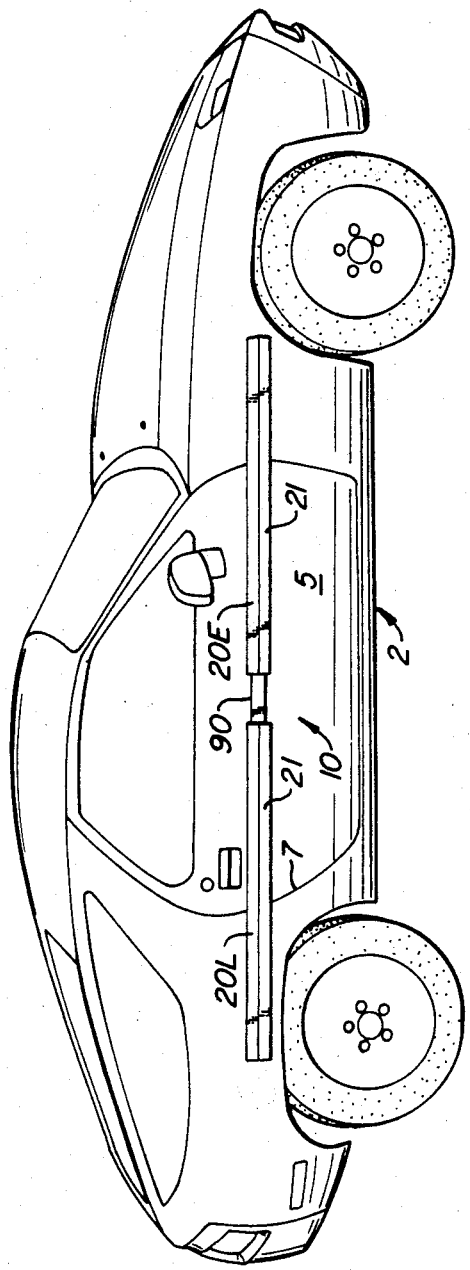
FIG.—1.

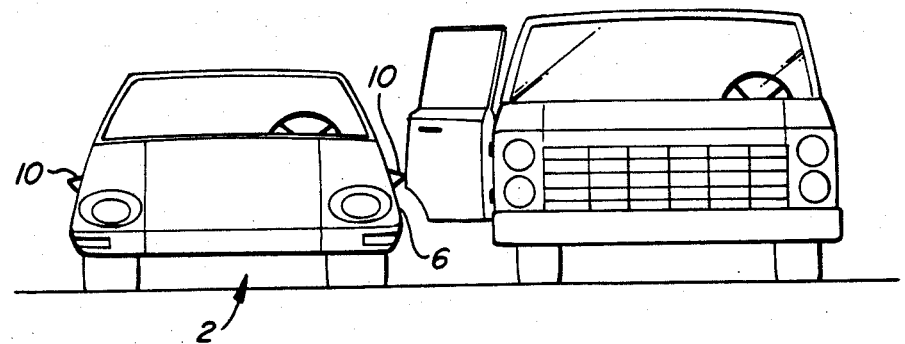
FIG.\_2.
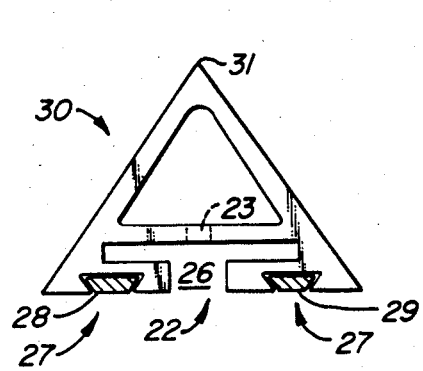
FIG.\_3.
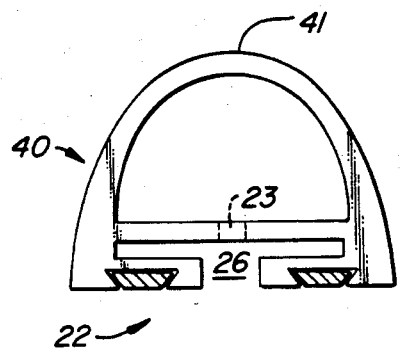
FIG.\_4.
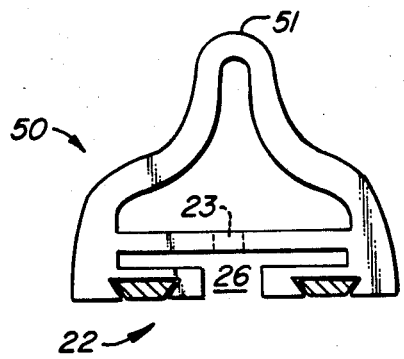
FIG.\_5.

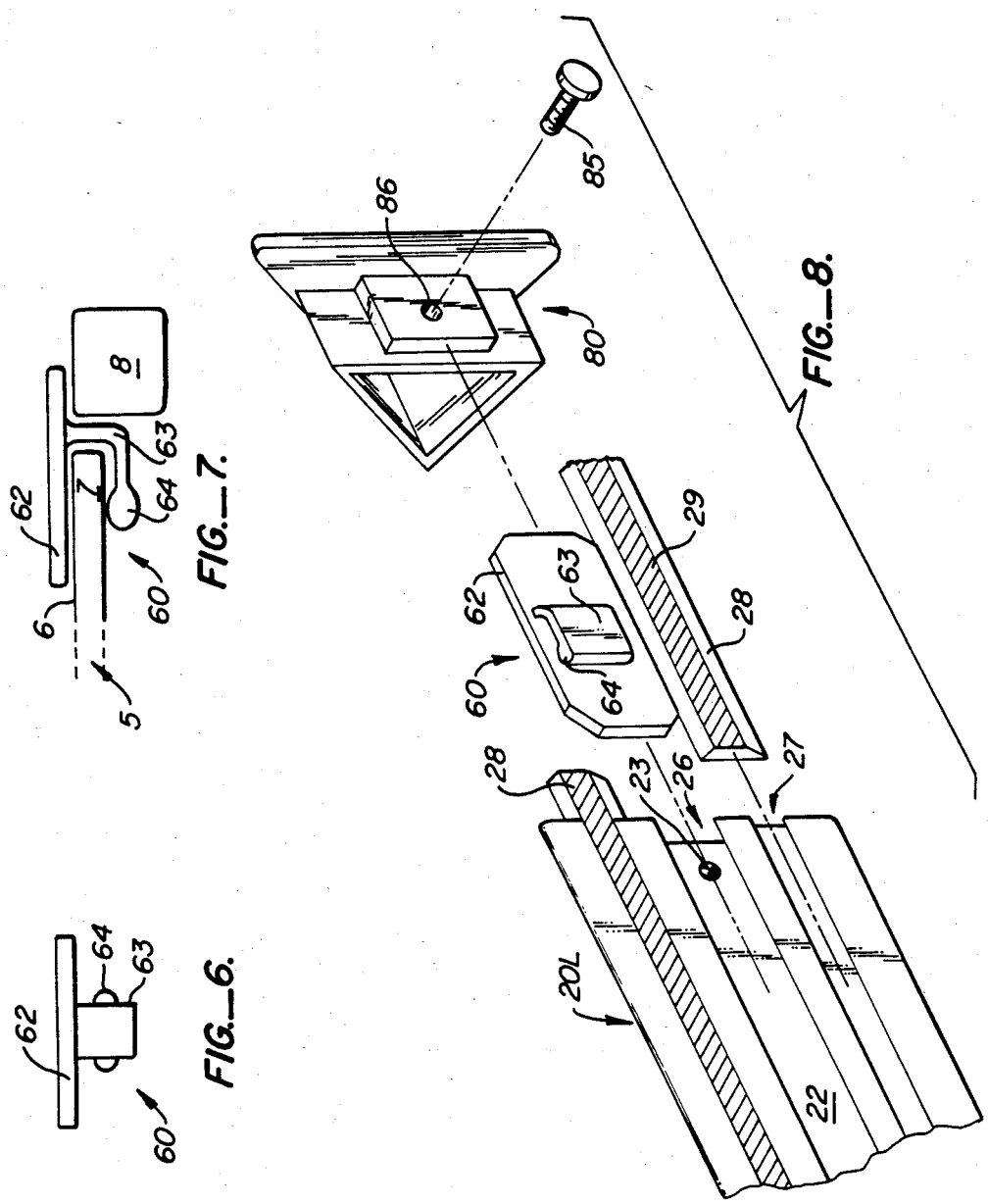

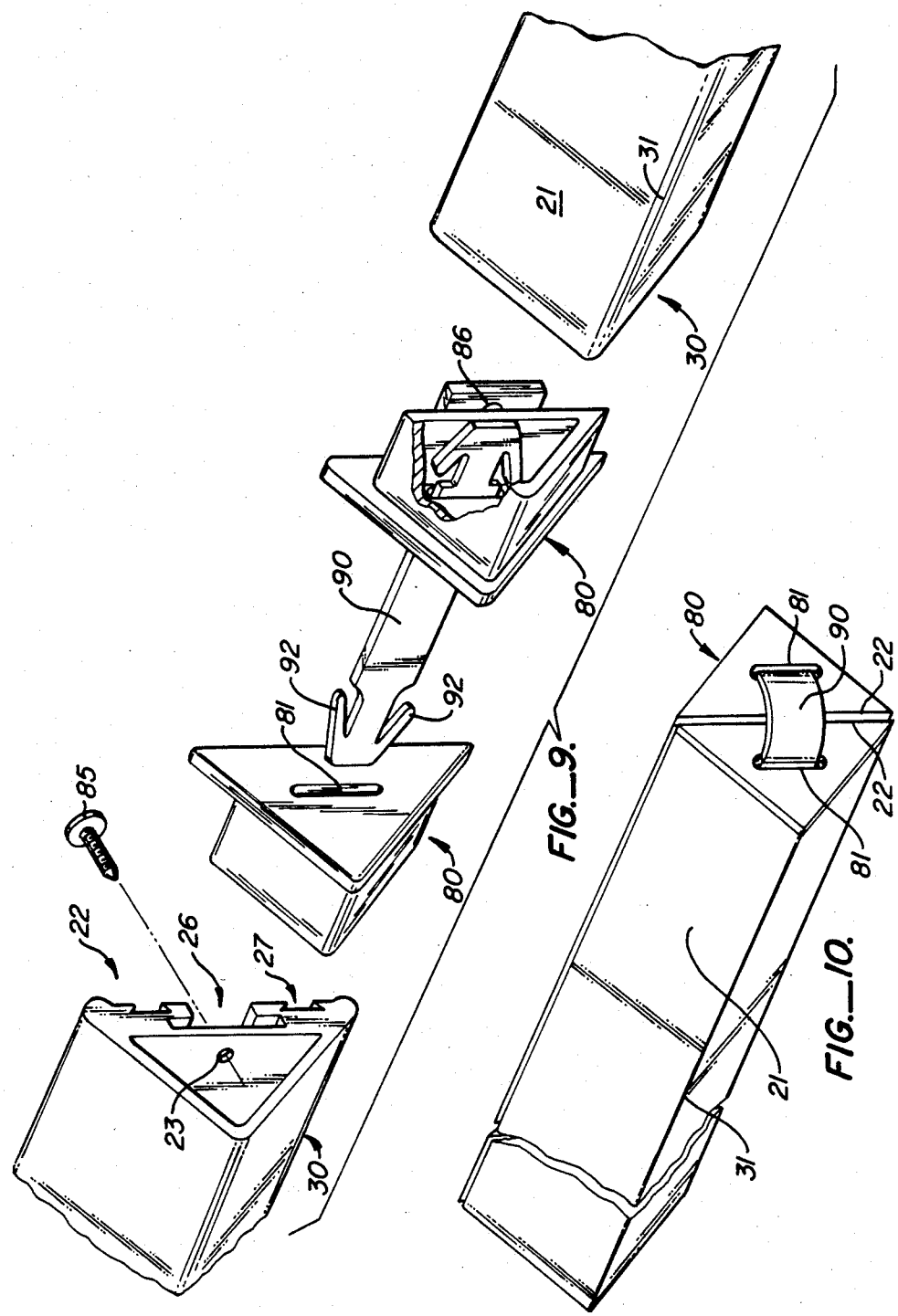

VEHICLE BODY PROTECTOR BUMPER

This invention relates to bumpers for protecting vehicle door, fender, and body panels from having a pint chipped or being dented when struck by objects such as doors opening from adjacently parked cars, errant shopping carts, or bicycles in parking lots, possibly exposing metal to rust, and impairing the appearance and resale value of the vehicle.

For body panels to be protected effectively requires a bumper structure projecting several inches, but permanent molding protectors designed for style and minimum air resistance typically project inadequately to intercept colliding doors of varied heights and profiles.

A temporarily mounted protector bumper can be larger, but the need to be adjustably and securely mountable and demountable has limited the size, effectiveness and convenience of prior art vehicle panel protector bumpers.

Protector bumpers are provided with springs or elastic tensioning between hooks anchored, in U.S. Pat. No. 2,889,165, on car door edges, or in U.S. Pat. No. 4,002,363 in front and rear wheel wells. Hooks have sharp edges able to scratch paint finishes, and can rust, while springs are liable to fatigue. These bumpers are complex, yet cannot be positioned adjustably, and do not provide or accommodate extension sections to protect panels beyond the hook anchor points. The U.S. Pat. No. 4,002,363 protector, whose hooks can fall from downward opening wheel wells, is also held to a door edge by a clip, exposed to theft, which spaces the protector bumper from, and concentrates impacts on, the door surface.

A protector bumper provided by U.S. Pat. No. 3,309,129 uses wood or other rigid material, and separate magnets with hinges for orientation, to be freely positionable on curved body panels. These hinges also space the protector and concentrate impacts on the body panel.

U.S. Pat. No. 3,659,887 discloses a protector bumper which is freely positionable on a body panel, but embedded magnets are spaced from the panel surface and hold inadequately, requiring U.S. Pat. No. 4,294,478 to supplement holding with adhesive, which can accumulate grit, lose its effectiveness, and scratch the paint surface. Bumper protectors of U.S. Pat. Nos. 4,002,363, 3,659,887 and U.S. Pat. No. 4,294,478 are freely positionable, but have no security means, and are exposed to theft.

U.S. Pat. No. 3,582,134, U.S. Pat. No. 3,472,546 and U.S. Pat. No. 4,398,758 provide protector bumpers which can be semi-permanently mounted, by clip or cable, on a door edge, but which cannot be positioned freely. If the door clips or cables are not used, the bumper sections can be positioned on other body panels, but without anti-theft protection.

U.S. Pat. No. 4,498,697 provides a protector bumper which can be freely positioned, or secured to a door edge by an adjustable wire loop, but the exposed loop can be cut, and provides unsatisfactory anti-theft protection.

U.S. Pat. No. 4,401,331 provides a protector bumper with a main section mounted by springs and clips between door edges, with one end only having a socket for mounting an extension section across a panel ahead of, or behind, a door, but not both ahead and behind simultaneously.

There remains, therefore, a need for a vehicle body protector bumper which is conveniently positioned and mounted on a vehicle body panel, securable by anti-theft locking means, projects sufficiently to intercept a variety of door heights and curvatures, and is sufficiently strong and durable to distribute and absorb impacts.

SUMMARY

The protector bumper of this invention is made of two or more selected length and profile tubing sections, strip magnets, a lengthwise adjustable security tab, and a hinge connector, which facilitate temporary mounting, dismounting, and storage. The security tab in the base side is concealed and inaccessible when the protector bumper is mounted. All exterior surfaces are smooth, with no sharp edges to damage surfaces. End caps with slots regulate air escaping when compressd by impact on the tube. The protector bumper is weatherproof and durable.

Dismounted, the protector bumper folds compactly for storage, with the base sides facing and the magnets covering each other from grit accumulation.

BRIEF DESCRIPTION OF THE DRAWING

FIG. 1 is a side view of the protector bumper mounted on an automobile;

FIG. 2 shows a front end view of the protector bumper mounted on a car and struck by an adjacent car door;

FIG. 3 is a cross-section view of a triangular tube embodiment of the invention;

FIG. 4 is a cross-section view of a D-shaped tube embodiment;

FIG. 5 is a cross-section view of a T-shaped tube embodiment;

FIG. 6 is an end view of the security tab;

FIG. 7 is a side view of the security tab;

FIG. 8 is an exploded isometric view of a base side, security tab, strip magnets, and end cap;

FIG. 9 is an exploded isometric view of the hinge connector between two triangular end caps, one of which is partially cut away; and FIG. 10 is an isometric view of the protector of FIG. 3 folded for storage.

DETAILED DESCRIPTION

Referring to FIGS. 1 and 2, bumper protector 10 comprises locking section 20L and extension section 20E, preferably identical poly vinyl chloride (PVC) extruded tubular members, with a selected hardness (on the "durometer" scale between 65 and 90) to withstand typical blows by opening doors of adjacently parked cars, while being light weight and sufficiently flexible to conform to slightly curved vehilcle body panels. Sections 20L and 20E are each preferably thirty-two inches long, with base side 22, FIG. 8, two to three inches wide. To block car door edges of various heights and shapes from reaching surface 6 of car door 5, FIGS. 2 and 7, outer side 21, FIGS. 1 and 9, projects from base side 22 two to three inches, to apex 31 in triangular tubing 30, FIG. 3, to a smooth arch 41 in "D" section tubing 40, FIG. 4, or to a ridge 51 in "T" section tubing 50, FIG. 5.

Referring to FIGS. 3, 4, 5, and 8, magnets 28 are held by base 22, preferably mechanically in dovetail grooves 27, but other shape grooves 27 are suitable, or adhesive could be used. Magnets 28, FIG. 8, as provided for example by Magnet Sales and Manufacturing Co., Culver City, Calif., are flexible strips one-half to three-quarters inch wide, inserted lengthwise into grooves 27, on each side of base 22. Three-quarter inch wide strips 28 are preferably bevelled or skived to a one-half inch wide tread 29, and plastic coated to insure a smooth surface. Full length strips maximize magnet 28 holding strength, although other magent tread patterns 29 or interrupted strip magnets 28 could be used.

Between grooves 27, base 22 has a T-shaped track 26, FIGS. 3, 4, 5, 8 and 9, for sliding adjustable T-shaped security tab 60, FIGS. 6, 7, and 8. Security tab base 62 slides in T-track 26, while clip 63 pinches door edge 7, FIG. 7, to secure locking section 20L. Knob 64 is large enough to be lodged behind the gap between a closed door edge 7 and door post 8, providing an anti-theft mechanism, tab 60 preferably being high density polyethylene or semi-rigid elastomer, and relatively difficult to break or tear by hand.

Referring to FIGS. 8 and 9, an end cap 80 plugs into each end of each tube section 20L and 20E. Caps 80 limit sliding travel of security tab 60 in track 26, and also keep magnet strips 28 in grooves 27. End cap 80 has two holes 86 which are aligned with hole 23 in the end of each section 20L and 20E, and held by one way "pine tree" trainer 85, of injection molded plastic. End caps 80 close the hollow insides of tubes 30, with slots 81, FIG. 9, only allowing air to escape at a restricted rate, making tubing 20L and 20E a pneumatic shock absorber. Tubing sections 20L and 20E each use one end cap 80 slot 81 to anchor barbs 92 on the ends of hinge-connector 90, which connects, and allows adjusting the spacing between, sections 20L and 20E. Hinge connector 90 is preferably injection molded polypropylene or elastomer. Alternatively, instead of using end caps 80, tab 60 travel could be limited by non-rivets, now shown, seated in holes similarly to retainer 85.

To mount protector bumper 10 on car 2 as in FIGS. 1 and 2, security tab 60 is adjusted lengthwise in sliding track 26, FIG. 8, to engage and pinch the rear edge 7 of car door 5, FIG. 7, with bumper 10 postioned lengthwise at the selected elevation. With security tab 60 in place, locking section 20L is placed on door surface 6, and door 5 is closed. Depending on the proportions of car 2 and the body panel to be protected, when initially assembling protection bumper 10, before inserting retainers 85, security tab 60 is oriented for section 20E to lay on the car side either ahead of (as in FIG. 1) or behind locking section 20L. Hinge connector 90 allows sections 20L and 20E to be mounted askew, if desired for better protection, or spaced as in FIG. 1, or without spacing between them.

When protector bumper 10 is dismounted from car 2, hinge connector 90 enables folding sections 20L and 20E together, FIG. 10, for storage, for example in a car trunk, with the two base sides 22 facing, and held together by their respective magnets 28, keeping out grit which could otherwise later damage a paint surface.

A preferred embodiment has been illustrated, of which modifications and adaptations within the scope of the invention will occur to those skilled in the art. The invention is limited only by the scope of the following claims.

We claim:

1. Vehicle body protector bumper means comprising:
    a plurality of elongate tubular members, flexibly conformable to vehicle body panel surfaces, each member having a lengthwise base side, said base side having magnet retaining means, at least one of said members having track means for lengthwise movement of a security tab means;
    magnet means held by each said base side;
    said security tab means slidably engaged in said track means, along the length of said member to allow adjustment thereof with clip means for holding the edge of a closed car door; and
    hinge connector means anchored between ends of separate tubular members, for folding the members lengthwise with the respective base sides facing together.
2. A protector bumper as in claim 1 wherein said tubular members have a selected hardness in the range from 65 to 90 on the durometer scale.
3. A protector bumper as in claim 2 wherein said tubular members comprise a polymer.
4. A protector bumper as in claim 3 wherein said tubular members are extruded polyvinyl chloride.
5. A protector bumper as in claim 2 wherein said tubular members are hollow.
6. A protector bumper as in claim 5 wherein said tubular members have a substantially triangular section across their lengthwise axis.
7. A protector bumper as in claim 5 wherein said tubular members have a substantially D shaped section across the lengthwise axis.
8. A protector bumper as in claim 5 wherein said tubular members have a substantially T shaped section across the lengthwise axis.
9. A protector bumper as in claim 5 further comprising end cap means for closing said tubular members, and wherein said hinge connector means are anchored between end cap means of separate members.
10. A protector bumper as in claim 9 wherein each said end cap means plugs into an end of a tubular member and has a slot capable of regulating the escape of air from inside the tubular member under compression.
11. A protector bumper as in claim 10 wherein said hinge connector means is slidably connected between slots in said two end caps thereby enabling adjustment of the spacing between the connected tubular members.
12. A protector bumper as in claim 1 wherein each said magnet means comprises a flexible composite magnetic strip.
13. A protector bumper as in claim 12 wherein said magnetic strip extends substantially the entire length of said base side.
14. A protector bumper as in claim 13 wherein each said magnetic strip is mechanically held by a groove in said base side.
15. A protector bumper as in claim 14 wherein said groove is a dovetail groove.
16. A protector bumper as in claim 14 wherein each tubular member base has two lengthwise grooves for holding magnet strips.
17. A protector bumper as in claim 1 wherein said clip means ends in a knob which lodges behind the gap between a vehicle door post and the edge of a closed vehicle door.

* * * * *